United States Patent [19]

Chung et al.

[11] 4,149,186

[45] Apr. 10, 1979

[54] METHOD AND APPARATUS FOR APPLYING A SCANNING CONTROL SIGNAL TO A TELEVISION RECEIVER

[76] Inventors: David H. Chung, 4046 Ben Lomond Dr., Palo Alto, Calif. 94306; Frederic S. Haynes, 19 Laburnum Rd., Atherton, Calif. 94025

[21] Appl. No.: 795,020

[22] Filed: May 9, 1977

[51] Int. Cl.² .................... H04N 5/00; H04B 9/00
[52] U.S. Cl. .................... 358/83; 250/199; 250/551; 358/86; 358/188
[58] Field of Search ............... 250/551, 199; 358/86, 358/188, 83; 179/2 DP; 360/33

[56] References Cited

U.S. PATENT DOCUMENTS

| | | | |
|---|---|---|---|
| 3,270,131 | 8/1966 | Dinter | 358/188 |
| 3,484,548 | 12/1969 | Kowal | 358/188 |
| 3,497,616 | 2/1970 | McCown | 250/551 |
| 3,634,618 | 1/1972 | von der Ohe | 360/33 |
| 3,794,841 | 2/1974 | Cosentino | 250/199 |
| 4,054,794 | 10/1977 | Laughlin | 250/199 |

*Primary Examiner*—Howard W. Britton
*Attorney, Agent, or Firm*—C. Michael Zimmerman

[57] ABSTRACT

A method and apparatus is described for applying a video composite signal to the antenna input of a television receiver while at the same time electrically isolating such input from the equipment which generates the composite signal. The method includes the step of connecting to the antenna input a modulator for the composite signal having an optical sensor at its input for receiving optical radiation defining the composite signal, and converting the same into an electrical signal providing information to the modulator defining such composite signal. It further includes transmitting to the optical sensor optical radiation defining the desired composite signal. The apparatus includes the combination of an oscillator for generating a carrier signal, a modulator for modulating the carrier signal with a composite signal, and an optical sensor connected to the input of the modulator which receives optical radiation defining the composite signal and converts the same to an electrical control signal for the modulator defining the desired composite signal.

7 Claims, 1 Drawing Figure

METHOD AND APPARATUS FOR APPLYING A SCANNING CONTROL SIGNAL TO A TELEVISION RECEIVER

BACKGROUND OF THE INVENTION

The present invention relates to the application of scanning control signals to television receivers and, more particularly, to a method and apparatus for applying a scanning control signal to a television receiver which isolates the receiver electrically from the equipment or device generating such signal.

Standard home television receivers are increasingly being used to display information visually which is not broadcast over air waves. The device which generates the desired information to be displayed typically is connected to the antenna input of the TV receiver and provides a scanning control signal, e.g., a full composite video signal, through such input to direct the receiver to produce the desired display. The video game arrangements which have proliferated in the last several years are examples of devices which utilize television receiver displays. The scanning control signal of such a game arrangement typically directs the receiver to produce a game background and moving players, paddles and/or other objects.

Television receivers are designed to receive information defining a desired screen display on a radio frequency carrier signal. The auxiliary devices which are connected to the antenna input therefore also include most often a radio frequency oscillator, as well as the circuitry and other equipment necessary to generate the desired control signal. Because of such, there has been concern that the auxiliary equipment connected to the antenna input may inadvertently radiate radio frequency or other interfering radiation. While care is taken to design the auxiliary equipment so as not to cause unwanted radiation during normal operation, it is very difficult to eliminate them. This is especially true in equipment having long conductors carrying RF signals.

Because of this potential radiation hazard, all devices designed to be connected to a television receiver antenna input must be type-approved for such use by the U.S. Government before they can be marketed. This has delayed introduction to the market of many devices which, in fact, can be safely connected to television receivers. This problem is aggravated by the escalating number of different proposed devices designed to utilize television sets as display terminals.

SUMMARY OF THE INVENTION

The present invention provides a method and apparatus which enables home television receivers to be used as visual display terminals for auxiliary electrical equipment while at the same time electrically isolating the equipment from the receiver. Basically, the invention utilizes an optical signal to transmit between the video generating equipment and the television set, the scanning control signal which is to be applied to such set. That is, the method and apparatus of the invention comprehends converting the television scanning control signal which is generated by the auxiliary equipment into optical radiation which is then transmitted, preferably via an optical conductor, to an optical sensor which converts the same to an electrical signal providing information defining the scanning control signal. The electrical signal can then be fed to the antenna input of the television device in a conventional manner, i.e., by being used to modulate a carrier signal applied to the antenna input.

In keeping with the above, the method of the invention comprises the steps of connecting a carrier signal modulator to the antenna input of a television receiver, which modulator has an optical sensor at its input that converts any optical radiation it receives defining a scanning control signal to a corresponding electrical signal; and transmitting to the optical sensor optical radiation defining a desired scanning control signal. The apparatus includes means to generate a carrier signal, means to modulate the carrier signal with a scanning control signal, and means connected to the input of the modulator for receiving optical radiation defining the desired scanning control signal and converting the same to an electrical signal defining the same.

It will be recognized from the above that the invention assures that electrical problems in the video generating equipment will not cause unwanted electrical signals to be applied to the antenna input of the television set since such equipment is electrically isolated from the set. However, in spite of such isolation, quite effective means is provided to convey to the TV set information defining the desired scanning control signal.

The invention includes other features and advantages which will be discussed or will become apparent from the following more detailed description of a preferred embodiment.

BRIEF DESCRIPTION OF THE DRAWING

With reference to the accompanying single sheet of drawing, the single FIGURE is a schematic block diagram of a preferred embodiment of the invention.

DETAILED DESCRIPTION OF THE PREFERRED EMBODIMENT

Figure 1:
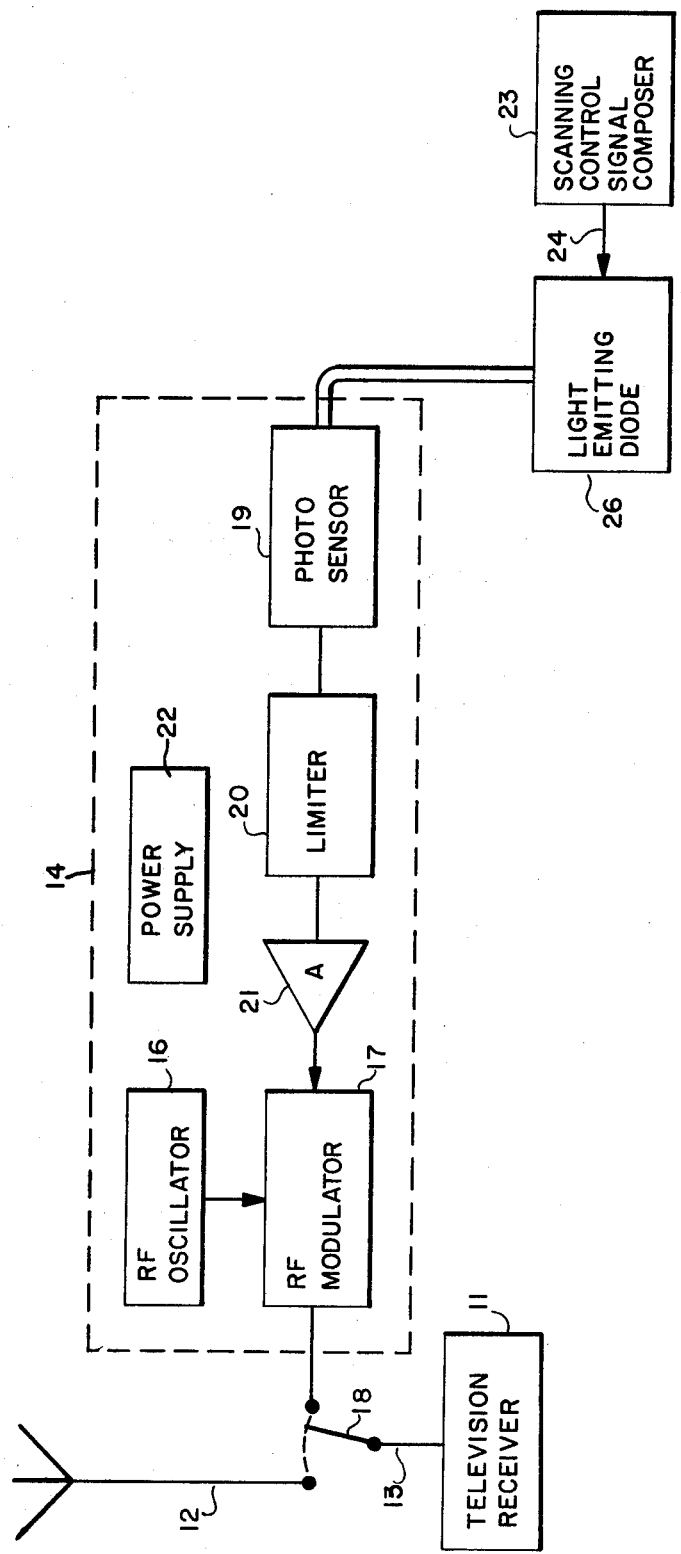

With reference to the accompanying FIGURE, a television receiver designed to normally receive its scanning control signal, i.e., a composite video signal, on a radio frequency carrier transmitted at least partly over air waves, is referred to by the reference numeral 11. In normal operation, the carrier signal is received by an antenna 12 and transmitted to the television receiver 11 through its antenna input, represented by the line 13.

In keeping with the invention, apparatus encompassed by the dotted line 14 is provided for applying a scanning control signal to the receiver 11 through its antenna input 13 while electrically isolating such receiver from the device which generates the same. Such apparatus includes means in the form of a radio frequency oscillator 16 to generate a carrier signal. The output of oscillator 16 is fed to a modulator 17 which adds to the carrier signal information defining a desired scanning control signal. In the preferred embodiment, modulator 17 accomplishes this by modulating the amplitude of the carrier signal with the scanning control signal. The output of the modulator 17 is selectively connectable with the antenna input of the television receiver. That is, a switch 18 in the antenna line is operable to connect either the antenna 12 or the output of modulator 17 to the antenna input as desired.

In a conventional arrangement, it is the practice to connect directly to the RF modulator 17, the equipment or device which generates the scanning control signal. In accordance with the invention, however, such device is electrically isolated from the modulator and, hence, from the receiver 11. More particularly, means are connected to the input of the modulator to receive optical radiation defining the desired scanning control signal and convert the same to an electrical signal which will provide to the modulator, information defining such scanning control signal. That is, a photosensor 19 is connected to the input of the modulator 17 through an energy limiter 20 and an electrical signal amplifier 21. Photosensor 19 may be, for example, a photodiode which reacts to the intensity of light energy by generating an electrical current proportional to such intensity. Limiter 20 is included to prevent passage to the modulator 17 of high energy input which might damage the same.

The power for operation of the apparatus 14 is represented in the FIGURE by block 22. Preferably such power supply is in the form of batteries or the like to assure isolation of the apparatus 14 from all external electrical connection. However, if desired, the power supply can be provided by standard household supply. Although not shown, switch 18 can be connected to the power supply to automatically provide power to the components of apparatus 14 requiring the same whenever the switch connects such apparatus to the antenna input 13.

The means which generates the desired scanning control signal is represented in the drawing by composer block 23. As mentioned previously, such means can be a video game apparatus. Its output, as represented by line 24, is fed to a light emitting diode 26, rather than directly to an RF modulator. The diode 26 acts as means to convert the scanning control signal generated by the composer 23 to optical radiation which defines such signal. This is simply accomplished by amplitude modulating with the control signal a beam of light produced by diode 26.

Means are provided for transmitting the optical radiation from diode 26 to the photosensor 19. That is, an optical conductor 26 in the form of a light pipe or a fiber optic bundle connects the output of diode 26 to the input of sensor 19. As is known, such an optical conductor is capable of transmitting light along a curved path with relatively insignificant losses. In this connection, the term "optical radiation" as used herein is meant to include the visible portion of the spectrum, as well as that electromagnetic radiation having wave lengths closely adjacent to the visible spectra which has basically the same transmission properties as light.

From the above it will be seen that the composer 23 is electrically isolated from the modulator 17 and, hence, the receiver 11. However, its scanning control output signal is coupled to such modulator to provide the desired modulation by a media, optical energy, which does not deleteriously affect the isolation. It is only the apparatus 14 which is directly connected to the antenna input of the television receiver and must be carefully shielded and otherwise constructed to prevent radio frequency leakage. In this connection, it should be noted that since the scanning control signal composer is not itself part of apparatus 14, such apparatus can be placed quite close to the television set itself, thereby shortening the length of antenna lead between such apparatus and the set which if not properly shielded may also radiate radio frequency leakage.

While the invention has been described in connection with a preferred embodiment, it will be appreciated by those skilled in the art that various changes and modifications can be made without departing from its spirit. It is therefore intended that the scope of the invention be defined only by such spirit as covered by the claims and their equivalent language.

We claim:
1. A method of applying a scanning control signal to a television receiver comprising the steps of:
   generating an electrical scanning control signal;
   modulating the intensity of a beam of optical radiation with said scanning control signal to contain information defining such signal;
   connecting to the antenna input of said television receiver a carrier signal modulator having an optical sensor at its input for receiving optical radiation defining said scanning control signal and converting the same into an electrical signal defining said scanning control signal to the full extent required for control of display scanning by said television receiver; and
   transmitting to said optical sensor optical radiation defining said scanning control signal.

2. A method according to claim 1 of applying a scanning control signal to a television receiver wherein said step of transmitting to said optical sensor optical radiation defining said signal includes conveying said optical radiation to said optical sensor through a conductor of optical energy.

3. Apparatus for applying a scanning control signal to a television receiver comprising the combination of:
   means to generate a radio frequency carrier signal;
   means to modulate said carrier signal with a scanning control signal;
   means connected to the input of said modulation means to receive optical radiation defining completely a scanning control signal and convert the same to an electrical signal providing to said modulation means information defining said scanning control signal to the full extent required for control of display scanning by said television receiver; and
   means to connect the output of said modulation means to the antenna input of said television receiver.

4. Apparatus according to claim 3 for applying a scanning control signal to a television receiver wherein said means to connect the output of said modulation means to the antenna input of said television receiver comprises a switch operable to connect alternatively to said antenna input, said modulation means and an antenna for receiving a radiated wave defining a composite video signal.

5. Apparatus according to claim 3 for applying a scanning control signal to a television receiver further including a battery power supply connected to said modulation means to provide electrical power thereto.

6. Apparatus according to claim 3 for applying a scanning control signal to a television receiver further including means to generate a scanning control signal; means to convert said generated scanning control signal to optical radiation defining said signal; and means to transmit said optical radiation to said means connected to the input of said modulation means.

7. Apparatus according to claim 6 for applying a scanning control signal to a television receiver wherein said means to transmit said optical radiation to said means connected to the input of said modulation means is an optical conductor.

* * * * *